E. C. BATES.
TREE PROTECTORS.

No. 184,749. Patented Nov. 28, 1876.

WITNESSES.
N. C. Lombard
E. A. Hemmenway

INVENTOR.
Edward C. Bates

UNITED STATES PATENT OFFICE.

EDWARD C. BATES, OF BOSTON, MASSACHUSETTS.

IMPROVEMENT IN TREE-PROTECTORS.

Specification forming part of Letters Patent No. 184,749, dated November 28, 1876; application filed August 28, 1876.

*To all whom it may concern:*

Be it known that I, EDWARD C. BATES, of Boston, in the county of Suffolk and State of Massachusetts, have invented certain new and useful Improvements in Tree-Protectors, of which the following, taken in connection with the accompanying drawings, is a specification:

My invention relates to that class of tree-protectors in which an annular trough filled with oil or other suitable liquid, encompassing the trunk of the tree, is used, and is an improvement upon the invention patented to David P. Mathews, September 11, 1866, and numbered 57,937.

My invention consists in the use of a cylindrical hoop or band permanently attached to the outer edge of the roof, and depending perpendicularly therefrom, and a hoop or band detachably connected thereto, in such a manner that it may be readily and easily removed therefrom and dropped below the trough, to admit of free access thereto for cleaning or filling the same, and as readily and easily applied again without the aid of solder or the use of tools, said band being so arranged that when in position its lower edge extends below the level of the upper edge of the trough, and serves as an effectual guard or shield to prevent the admission of water to the trough during a driving storm, and also as an additional brace or stiffener to the outer edge of the roof.

Figure 2:
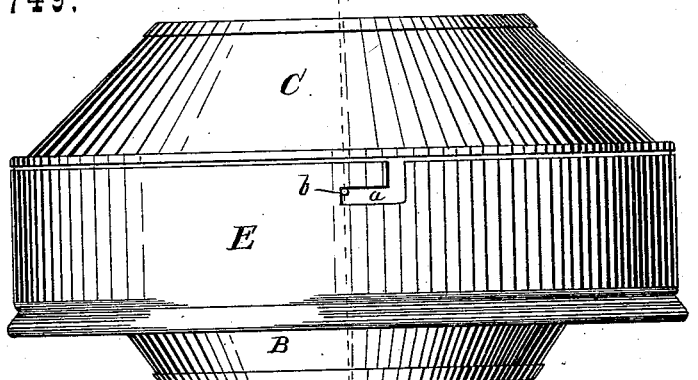
Figure 1:
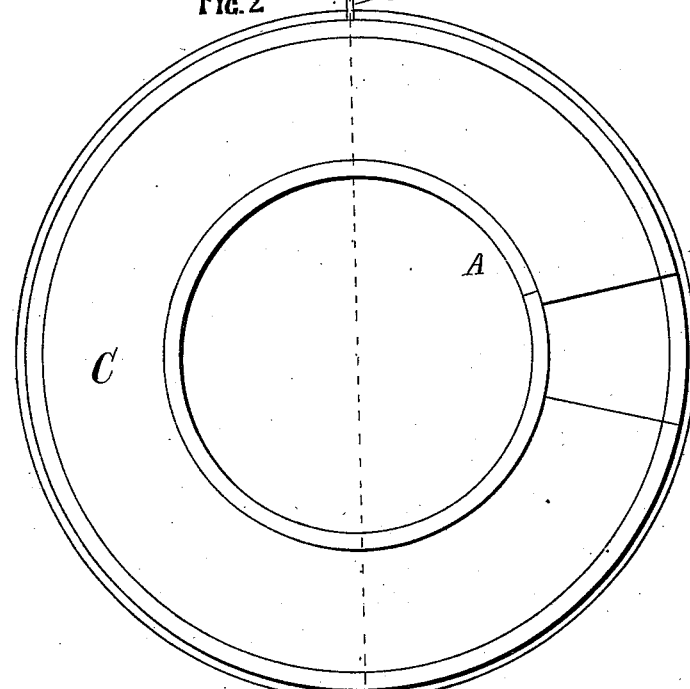
Figure 3:
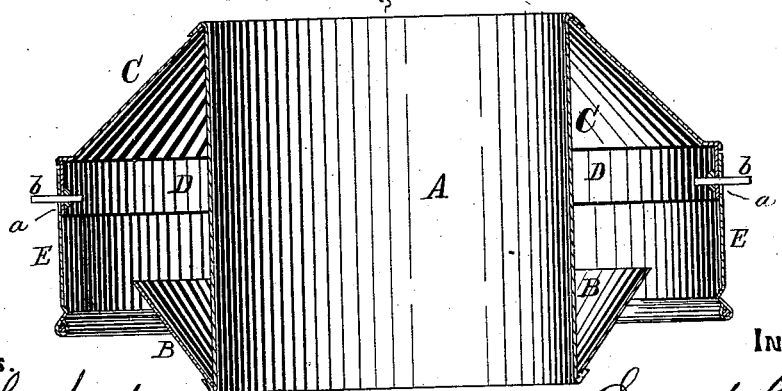

Figure 1 of the drawings is a plan of my improved tree-protector. Fig. 2 is an elevation, and Fig. 3 is a central vertical section of the same on line $x$ $x$ on Figs. 1 and 2.

A is a cylinder, of suitable diameter to surround the trunk of a tree, with suitable space between it and the body of the tree to permit the growth of the tree, said space being filled with a packing of oakum, tow, or other suitable material that will prevent the passage of the grubs between the cylinder and the body of the tree, and at the same time be sufficiently yielding to permit the growth of the tree without injuriously affecting the protector. B is a curved band of sheet metal, soldered together at its two ends, and by its inner edge to the lower end of the cylinder A, in the form of an inverted frustum of a cone, so as to form an annular trough extending entirely around the cylinder, as shown. C is another conical frustum, permanently attached by its inner edge to the upper end of the cylinder A, and projecting outward and downward till its outer edge overhangs the outer edge of the trough B. D is a narrow hoop or band of sheet metal, permanently attached by soldering or otherwise to the outer edge of the conical roof or hood C, and depending perpendicularly therefrom, to serve as a brace or stiffener to the outer edge of the roof C, to prevent it from being warped or twisted out of shape by the action of the sun and the weather. The lower edge of the band D is sufficiently far above the upper edge of the trough B to admit of free access to said trough for cleaning it out or for filling it with oil. E is another band or hoop, in the form of a short cylinder, but of considerably greater vertical width than the band D, over which it is fitted to slip, as shown in Fig. 3, said band, when in position, forming an extension downward of the roof C in the form of a shield or guard, to prevent the trough B from being filled by water in case of a driving storm, the lower edge of said band extending some distance below the level of the upper edge of the trough B for that purpose. The band E is provided with two slots, $a$, upon opposite sides thereof, cut through its upper edge, which engage with the pins $b$, set in and projecting laterally from the band D.

It is obvious that a greater number of slots and pins may be used, if desired, and that spring-catches may be used instead of the slots $a$ and pins $b$; or the band E may be held entirely by friction between it and the band D, it being made to fit sufficiently tight thereon for the purpose, but not so tight but that it may be removed at pleasure by pulling it downward.

What I claim as new, and desire to secure by Letters Patent of the United States, is—

1. The combination, in a tree-protector, of the conical roof C, the cylindrical band D, permanently attached to and depending from the outer edge of the roof C, and the cylindrical band E, fitted to slip over the band D, and adapted to be readily removed therefrom, as and for the purposes described.

2. The combination, in a tree-protector, of the conical roof C, the cylindrical band D, permanently attached to the outer edge of the roof C, and provided with two or more pins, $b$, and the cylindrical band E, fitted to slip over the band D, and provided with two or more slots, $a$, adapted to engage with the pins $b$, as and for the purposes described.

Executed at Boston, Massachusetts, this 25th day of August, 1876.

EDWARD C. BATES.

Witnesses:
N. C. LOMBARD,
E. A. HEMMENWAY.